(12) United States Patent (10) Patent No.: US 12,621,676 B2

Rathore et al. (45) Date of Patent: May 5, 2026

(54) SYSTEMS AND METHODS FOR SERVICE GAP MITIGATION OR ELIMINATION VIA NEW SITE RECOMMENDATION

(71) Applicant: Rakuten Symphony, Inc., Tokyo (JP)

(72) Inventors: Durgesh Rathore, Indore (IN); Nilesh Bankar, Indore (IN); Atul Rajpoot, Indore (IN); Sudeep Kumar Jain, Indore (IN)

(73) Assignee: RAKUTEN SYMPHONY, INC., Tokyo (JP)

( * ) Notice: Subject to any disclaimer, the term of this patent is extended or adjusted under 35 U.S.C. 154(b) by 507 days.

(21) Appl. No.: 18/013,336

(22) PCT Filed: Nov. 28, 2022

(86) PCT No.: PCT/US2022/051059
§ 371 (c)(1),
(2) Date: Dec. 28, 2022

(87) PCT Pub. No.: WO2024/118043
PCT Pub. Date: Jun. 6, 2024

(65) Prior Publication Data

US 2024/0276233 A1 Aug. 15, 2024

(51) Int. Cl.
*H04W 4/00* (2018.01)
*H04W 16/18* (2009.01)
*H04W 24/02* (2009.01)

(52) U.S. Cl.
CPC ........... *H04W 16/18* (2013.01); *H04W 24/02* (2013.01)

(58) Field of Classification Search
CPC .............................. H04W 16/18; H04W 24/02
See application file for complete search history.

(56) References Cited

U.S. PATENT DOCUMENTS 7,925,266 B1 4/2011 Tran
8,639,212 B1 * 1/2014 Sennett ................. H04W 16/26
455/457

(Continued)

FOREIGN PATENT DOCUMENTS

CN 113015176 A 6/2021

OTHER PUBLICATIONS

Written Opinion dated Mar. 28, 2023 issued in International Application No. PCT/US 22/51059.

(Continued)

*Primary Examiner* — Abdelnabi O Musa
(74) *Attorney, Agent, or Firm* — Sughrue Mion, PLLC

(57) ABSTRACT

A method may include determining an area of a service gap and an area of a candidate site; multiplying the candidate site area by a predetermined percentage to determine a threshold; when the service gap area is greater than or equal to the threshold, dividing the service gap area by the candidate site area to determine a number of recommended sites; determining a centroid and a perimeter of the service gap; determining a perimeter section distance by dividing the perimeter of the service gap by the number of recommended sites; generating a new site shape based on the service gap centroid, a point on the service gap boundary, and the perimeter section distance; and determining a recommended site location based on a centroid of the new site shape.

18 Claims, 12 Drawing Sheets

(56) References Cited

U.S. PATENT DOCUMENTS

| | | | | |
|---|---|---|---|---|
| 8,718,654 | B2 * | 5/2014 | Power | H04W 24/02 |
| | | | | 455/442 |
| 2011/0131317 | A1 * | 6/2011 | Sanders | H04W 24/00 |
| | | | | 709/224 |
| 2014/0141788 | A1 | 5/2014 | Puthenpura et al. | |
| 2020/0169895 | A1 | 5/2020 | Chen et al. | |
| 2021/0037394 | A1 * | 2/2021 | Wainer | G06N 5/01 |
| 2021/0184933 | A1 * | 6/2021 | Soryal | H04L 41/5009 |
| 2022/0240100 | A1 * | 7/2022 | Sakamoto | H04W 16/18 |
| 2025/0097817 | A1 * | 3/2025 | Rajpoot | H04W 16/28 |

OTHER PUBLICATIONS

International Search Report dated Mar. 28, 2023 issued in International Application No. PCT/US22/51059.
Feng, et al., "A coverage hole detection and repair algorithm in wireless sensor networks", Cluster Computing, 2019, vol. 22, pp. S12473-S12480 (8 pages).

* cited by examiner

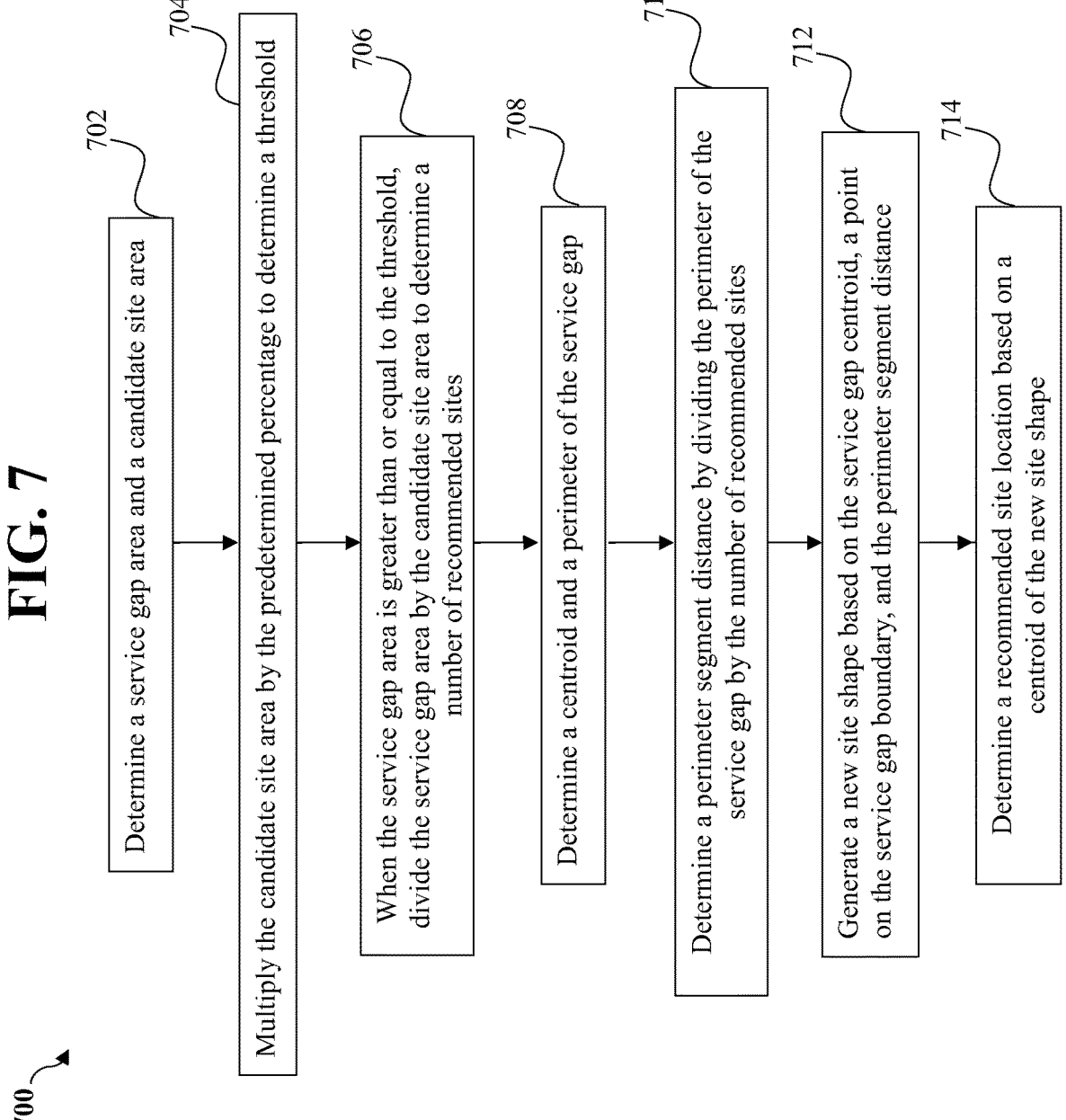

700

702 — Determine a service gap area and a candidate site area

704 — Multiply the candidate site area by the predetermined percentage to determine a threshold 706 — When the service gap area is greater than or equal to the threshold, divide the service gap area by the candidate site area to determine a number of recommended sites 708 — Determine a centroid and a perimeter of the service gap 710 — Determine a perimeter segment distance by dividing the perimeter of the service gap by the number of recommended sites 712 — Generate a new site shape based on the service gap centroid, a point on the service gap boundary, and the perimeter segment distance 714 — Determine a recommended site location based on a centroid of the new site shape

SYSTEMS AND METHODS FOR SERVICE GAP MITIGATION OR ELIMINATION VIA NEW SITE RECOMMENDATION

CROSS REFERENCE TO RELATED APPLICATIONS

This application is a National Stage of International Application No. PCT/US2022/051059 filed Nov. 28, 2022.

FIELD

The disclosure is related generally to mitigating or eliminating service gaps in network coverage via new site determination and recommendation.

DESCRIPTION OF RELATED ART

A network area may include service gaps that have poor network coverage or no network coverage. Service gaps downgrade the overall quality and performance of the network, and are a cause of dissatisfaction for network users or customers of a telecommunications operator. Thus, eliminating or mitigating the negative impact caused by service gaps is important in order to provide reliable and high-quality network performance. Related art systems have failed to provide efficient solutions for mitigating or eliminating service gaps. Accordingly, there exists a need for improved processes for mitigating and/or eliminating service gaps.

SUMMARY

According to embodiments, systems and methods are provided for generating information related to site recommendations, which may be used to mitigate and/or eliminate service gaps to thereby improve the reliability and quality of network performance.

One method of determining a number of recommended sites may include determining an area of a service gap: determining an area of a candidate site: comparing the area of the service gap to the area of the candidate site to determine a comparison; and determining a number of recommended sites based on the comparison.

According to additional or alternative embodiments, an information processing system may determine a number of recommended sites. The information processing system may include at least one memory configured to store computer program code. The information processing system may also include at least one processor configured to access the at least one memory and operate as instructed by the computer program code. The computer program code may include first determining code configured to cause at least one of the at least one processor to determine an area of a service gap. The computer program code may include second determining code configured to cause at least one of the at least one processor to determine at least one of an area of a macro site or an area of a micro site. The computer program code may include comparing code configured to cause at least one of the at least one processor to compare the area of the service gap to at least one of the area of the macro site or the area of the micro site to determine a comparison: and the computer program code may also include third determining code configured to cause at least one of the at least one processor to determine a number of recommended sites based on the comparison.

Additional aspects will be set forth in part in the description that follows and, in part, will be apparent from the description, or may be learned by practice of the presented embodiments of the disclosure.

BRIEF DESCRIPTION OF THE DRAWINGS

The above and other aspects, features, and aspects of embodiments of the disclosure will be more apparent from the following description taken in conjunction with the accompanying drawings, in which:

FIG. 7 is a flowchart of a method of mitigating or eliminating service gaps via new site recommendation(s), according to an example embodiment.

DETAILED DESCRIPTION

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Figure 1:
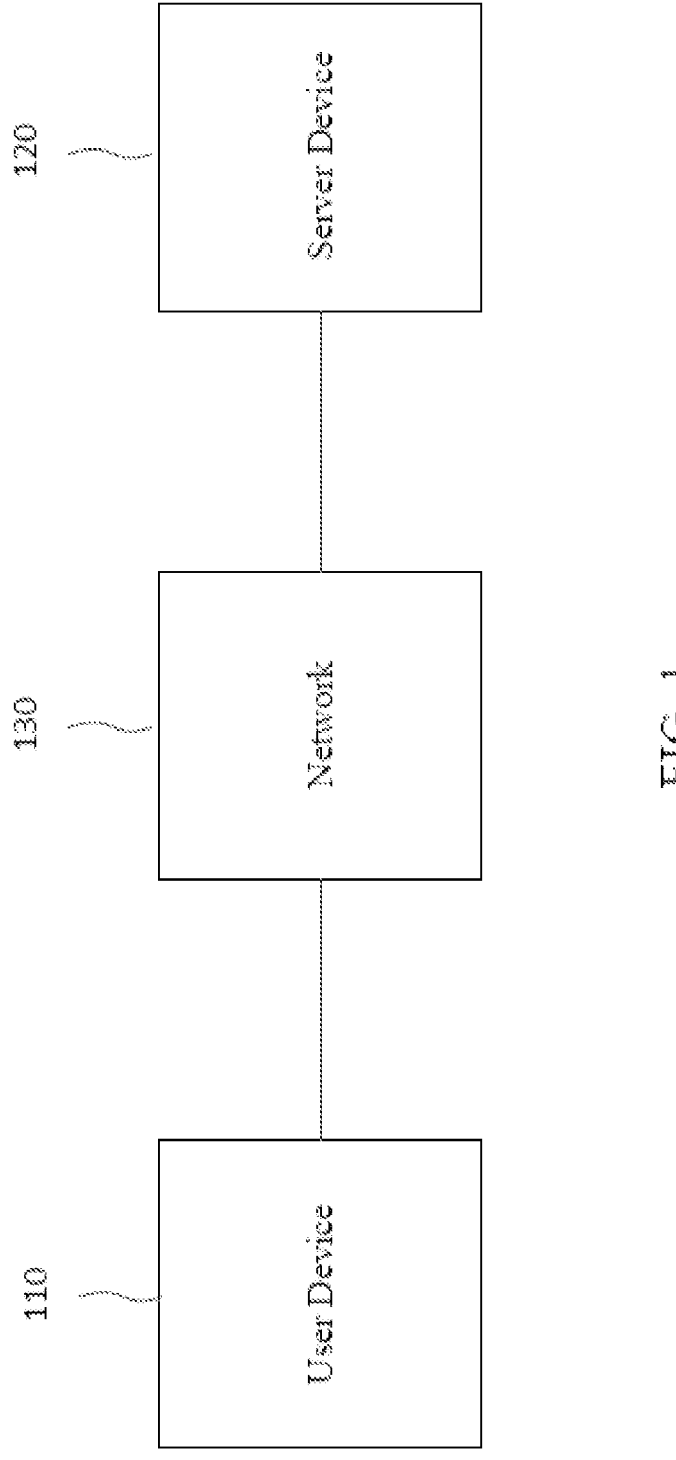
FIG. 1 is a diagram of a system according to an embodiment.

FIG. 1 is a diagram of a system according to an embodiment. FIG. 1 includes a user device 110, a server device 120, and a network 130. The user device 110 and the server device 120 may interconnect via through the network 130 providing wired connections, wireless connections, or a combination of wired and wireless connections.

The user device 110 may include a computing device (e.g., a desktop computer, a laptop computer, a tablet computer, a handheld computer, a smart speaker, a server device, etc.), a mobile phone (e.g., a smart phone, a radiotelephone, etc.), a camera device, a wearable device (e.g., a pair of smart glasses or a smart watch), or a similar device, according to embodiments.

The server device 120 may include one or more devices. For example, the server device 120 may be a server device, a computing device, or the like which includes hardware such as processors and memories, software modules and a combination thereof to perform corresponding functions.

The network 130 may include one or more wired and/or wireless networks. For example, network 130 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) may perform one or more functions described as being performed by another set of devices.

Figure 2:
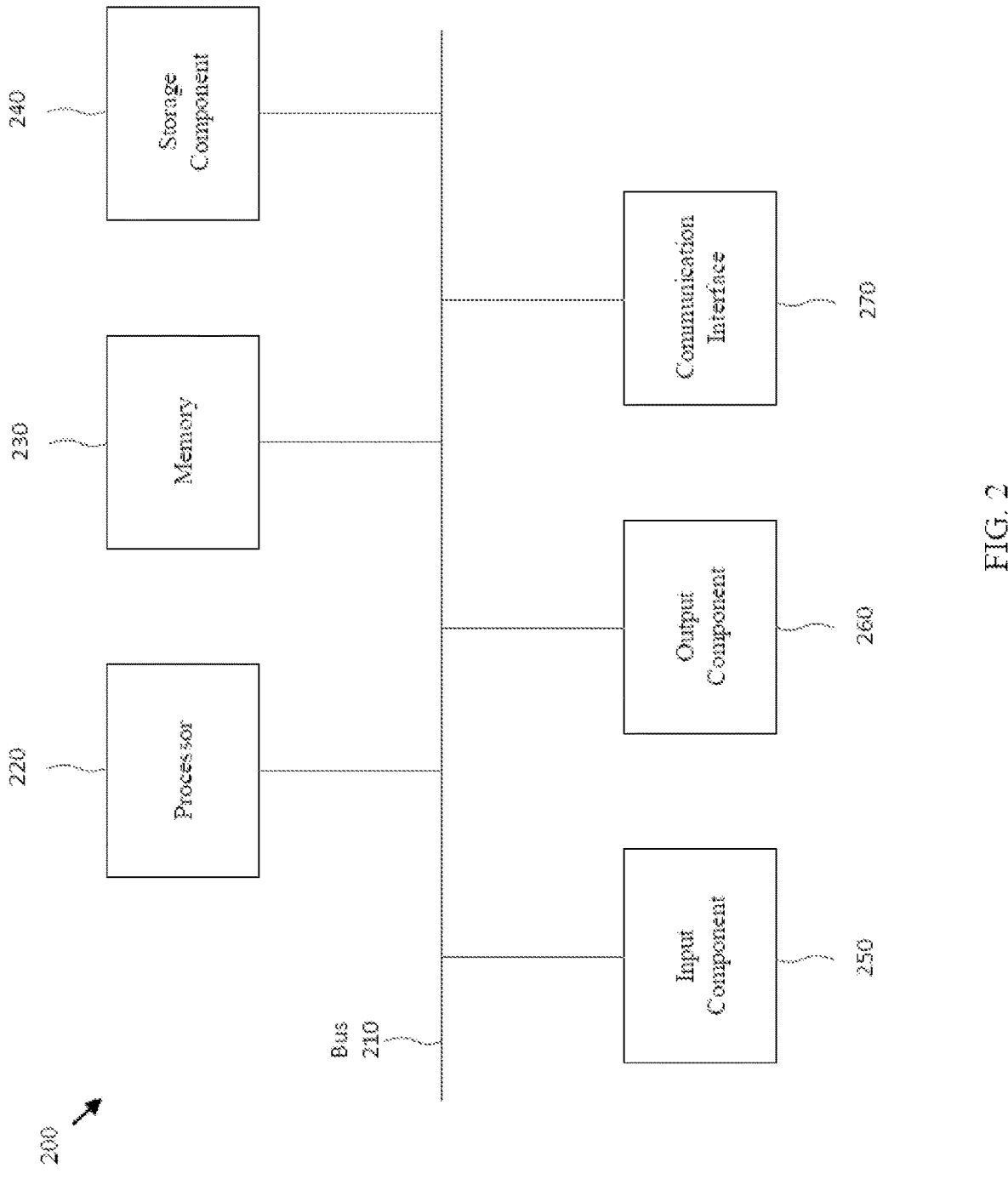
FIG. 2 is a diagram of components of the devices of FIG. 1 according to an embodiment.

FIG. 2 is a diagram of components of one or more devices of FIG. 1 according to an embodiment. Device 200 shown in FIG. 2 may correspond to the user device 110 and/or the server device 120.

As shown in FIG. 2, the device 200 may include a bus 210, a processor 220, a memory 230, a storage component 240, an input component 250, an output component 260, and a communication interface 270.

The bus 210 may include a component that permits communication among the components of the device 200. The processor 220 may be implemented in hardware, software, firmware, or a combination thereof. The processor 220 may be implemented by one or more of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), and another type of processing component. The processor 220 may include one or more processors capable of being programmed to perform a corresponding function.

The memory 230 may include a random access memory (RAM), a read only memory (ROM), and/or another type of dynamic or static storage device (e.g., a flash memory, a magnetic memory, and/or an optical memory) that stores information and/or instructions for use by the processor 220.

The storage component 240 may store information and/or software related to the operation and use of the device 200. For example, the storage component 240 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

The input component 250 may include a component that permits the device 200 to receive information, such as via user input (e.g., a touch screen display, a keyboard, a keypad, a mouse, a button, a switch, and/or a microphone). The input component 250 may also include a sensor for sensing information (e.g., a global positioning system (GPS) component, an accelerometer, a gyroscope, and/or an actuator).

The output component 260 may include a component that provides output information from the device 200 (e.g., a display, a speaker, and/or one or more light-emitting diodes (LEDs)).

The communication interface 270 may include a transceiver-like component (e.g., a transceiver and/or a separate receiver and transmitter) that enables the device 200 to communicate with other devices, such as via a wired connection, a wireless connection, or a combination of wired and wireless connections. The communication interface 270 may permit device 200 to receive information from another device and/or provide information to another device. For example, the communication interface 270 may include an Ethernet interface, an optical interface, a coaxial interface, an infrared interface, a radio frequency (RF) interface, a universal serial bus (USB) interface, a Wi-Fi interface, a cellular network interface, or the like.

The device 200 may perform one or more processes described herein. The device 200 may perform operations based on the processor 220 executing software instructions stored in a non-transitory computer-readable medium, such as the memory 230 and/or the storage component 240. A computer-readable medium is defined herein as a non-transitory memory device. A memory device includes memory space within a single physical storage device or memory space spread across multiple physical storage devices.

Software instructions may be read into the memory 230 and/or the storage component 240 from another computer-readable medium or from another device via the communication interface 270. When executed, software instructions stored in the memory 230 and/or storage component 240 may cause the processor 220 to perform one or more processes described herein.

Additionally, or alternatively, hardwired circuitry may be used in place of or in combination with software instructions to perform one or more processes described herein. Thus, embodiments described herein are not limited to any specific combination of hardware circuitry and software.

Provided as disclosed herein are systems, methods, and devices configured to mitigate or eliminate service gaps in a telecommunications network via recommending new sites. Specifically the methods, systems, and devices provide a way to easily recommend one or more sites to address a particular service gap, and additionally determine recommended locations of the one or more recommended sites.

"Service gap" and "service gap polygon" may be used interchangeably herein and may refer to a polygon generated over a smart network coverage layer, which shows one or more polygonal areas of a poor coverage zone in the network. The systems, methods and devices may generate service gap polygons for each band periodically and provide optimization suggestions to improve the coverage, and after the optimization suggestions are implemented, tracking the improvements of the service gaps. In some embodiments, optimization suggestions may include recommending one or more new sites and further recommending a new site location for each recommended new site.

First, a service gap may be identified. The identified service gap may be referred to as a service gap of interest. One or more service gaps may be identified by generating service gap polygons for each band. The generation of service gaps may occur on a reoccurring basis, e.g., periodically. When identifying service gaps, the system may utilize various inputs. One input may include a unified coverage layer. A unified coverage layer may be a smart layer generated by superimposing planning prediction data and live test data, and collecting samples from users. An updated band-wise unified coverage layer may be present. Another input may include a site database. The site database may store information for all sites in the network, including information on a latitude, a longitude, an azimuth, band details, on air status, on air date, base station (e.g., eNB) identifier (ID), an evolved universal terrestrial access network (E-UTRAN) cell global identifier (ECGI), antenna height, electrical tilt, mechanical tilt, transmission power, reference signal receive power (RSRP), etc. While the site database may include existing sites, the site database may further include sites under consideration for construction, or recommended sites. Therefore, the types of sites included in the site database is not particularly limited.

Other inputs may include clutter data, which includes information on area morphology (i.e., density of users or accesses), boundaries, which may include radio frequency (RF) cluster and region boundaries, a best server plot, which predicts coverage of a site calculated during a planning phase (e.g., generated from a prediction tool for on air sites), geo-location data, which may be collected using drive test tools such as net velocity, and may be passively collected data that has been used for a predetermined amount of time (e.g., 7 days), cell-wise preventative measurement (PM) counter key performance indicators (KPIs) such as call drop rate, radio resource control (RRC) attempts, RRC re-establishment attempts, mean control quality indicator (CQI), etc.

Figure 3A:
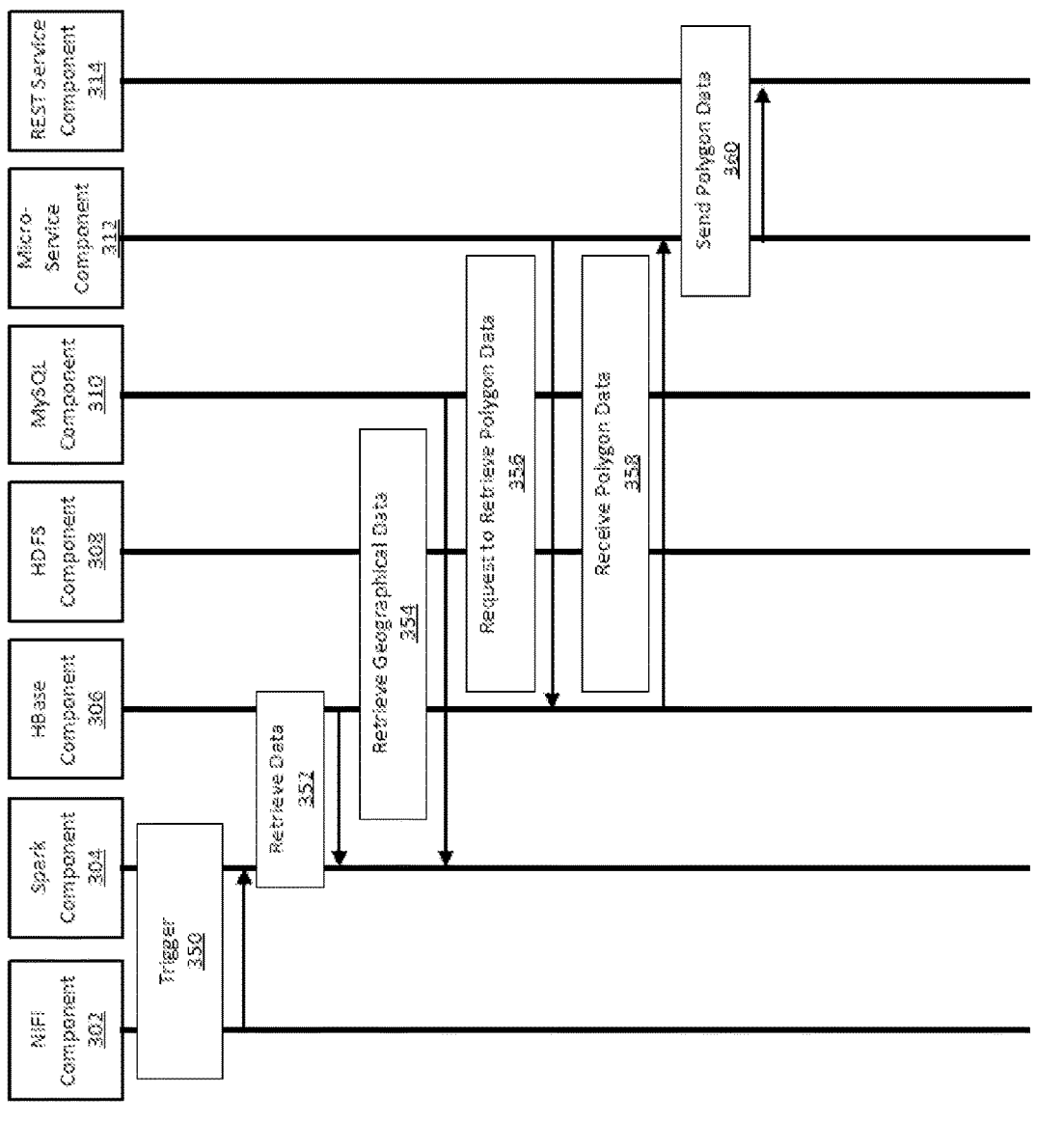
FIGS. 3A and 3B are diagrams of an operation flow of a system for identifying service gaps, according to an example embodiment.
Figure 3B:
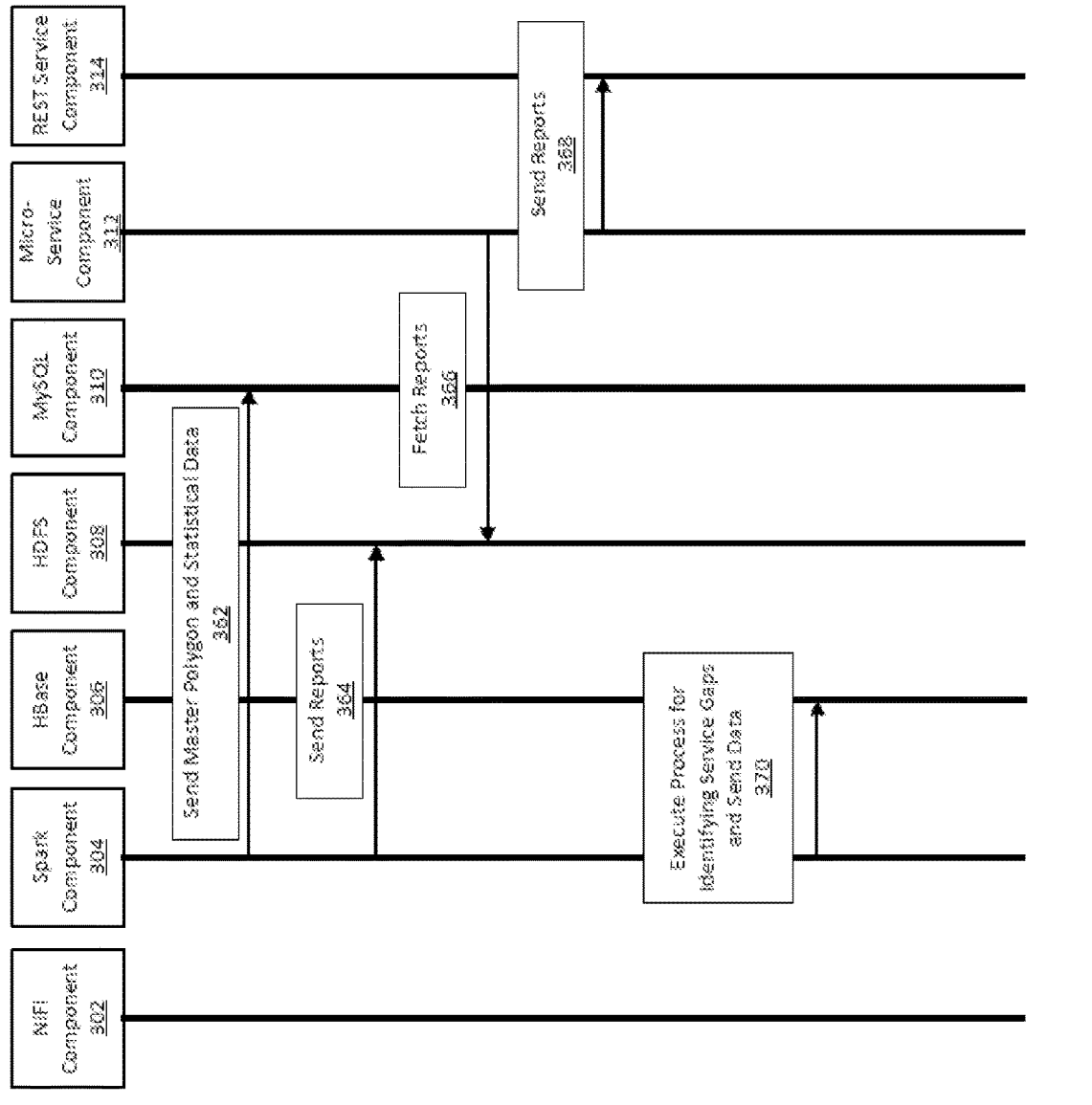

FIGS. 3A and 3B are diagrams of an operation flow of a system for identifying service gaps, according to an example embodiment. The system may include a NiFi component 302, a spark component 304, and HBase component 306, a Hadoop distributed file system (HDFS) component 308, a MySQL component 310, a micro-service component 312, and a representational state transfer (REST) service component 314.

The NiFi component 302 may include a software design that is based on a flow-based programming model and offer features that prominently include the ability to operate within clusters. The NiFi component 302 may be used to ingest streaming data from third-party applications such as Boomer Cell Identification data from various enhanced messaging service (EMS) applications.

The spark component 304 may include a parallel processing framework for running large-scale data analytics applications across clustered computers. The spark component 304 may handle both batch and real-time analytics and data processing workloads.

The HBase component 306 may include a column-oriented non-relational database management system that runs on top of an HDFS. The HBase component 306 may provide a fault-tolerant way of storing sparse data sets.

The HDFS component 308 may be configured for storage of all the raw data that the system uses. All batched data sources may be initially stored into the HDFS component 308 and then processed using the spark component 304. The HBase component 306 may also use the HDFS component 308 for its data storage infrastructure.

The MySQL component 310 may be configured for storage of processed data in the framework. The MySQL component 310 may be utilized for application programming interface (API) retrieval and for serving any real-time user interface (UI) requirements. The aggregated and correlated data may also be stored in the MySQL component 310.

The micro-service component 312 may be configured as an architectural style that structures an application as a collections of services that are highly maintainable and testable. The micro-service component 312 may be loosely coupled, independently deployable, and organized around business capabilities.

The REST service component 314 may be a service that conforms to a representational state transfer (REST) architecture.

In operation 350, the system triggers the spark component 304, with the NiFi component 302 to initiate the process of identifying service gaps. In operation 352, the spark component 304 retrieves data from the HBase component 306, such as the inputs described above. In operation 354, the spark component 304 retrieves geographical and site data from the MySQL component 310. In operation 356, the micro-service component 312 sends a request to the HBase component 306 to retrieve polygon data. In operation 358, the HBase component 306 transmits the requested polygon data to the micro-service component 312. In operation 360, the micro-service component 312 sends the retrieved polygon data to the REST service component 314 for visualization of the polygon data. In operation 362, the spark component 304 sends the master polygon and statistical data generated from the retrieved data (e.g., the inputs) to the MySQL component 310. In operation 364, the spark component 304 sends reports generated based on the retrieved data to the HDFS component 308 for storage. In operation 366, the micro-service component 312 fetches reports from the HDFS component 308. In operation 368, the micro-service component 312 sends the reports to the REST service component 314 for visualization (e.g., generating a map showing the service gaps or overlaying service gaps on an existing map). In operation 370, the spark component 304 executes the process for identifying service gaps (e.g., generating updated service gaps) at a predefined time interval (e.g., daily, weekly, etc.) and sends the data to the HBase component 306.

Figure 4:
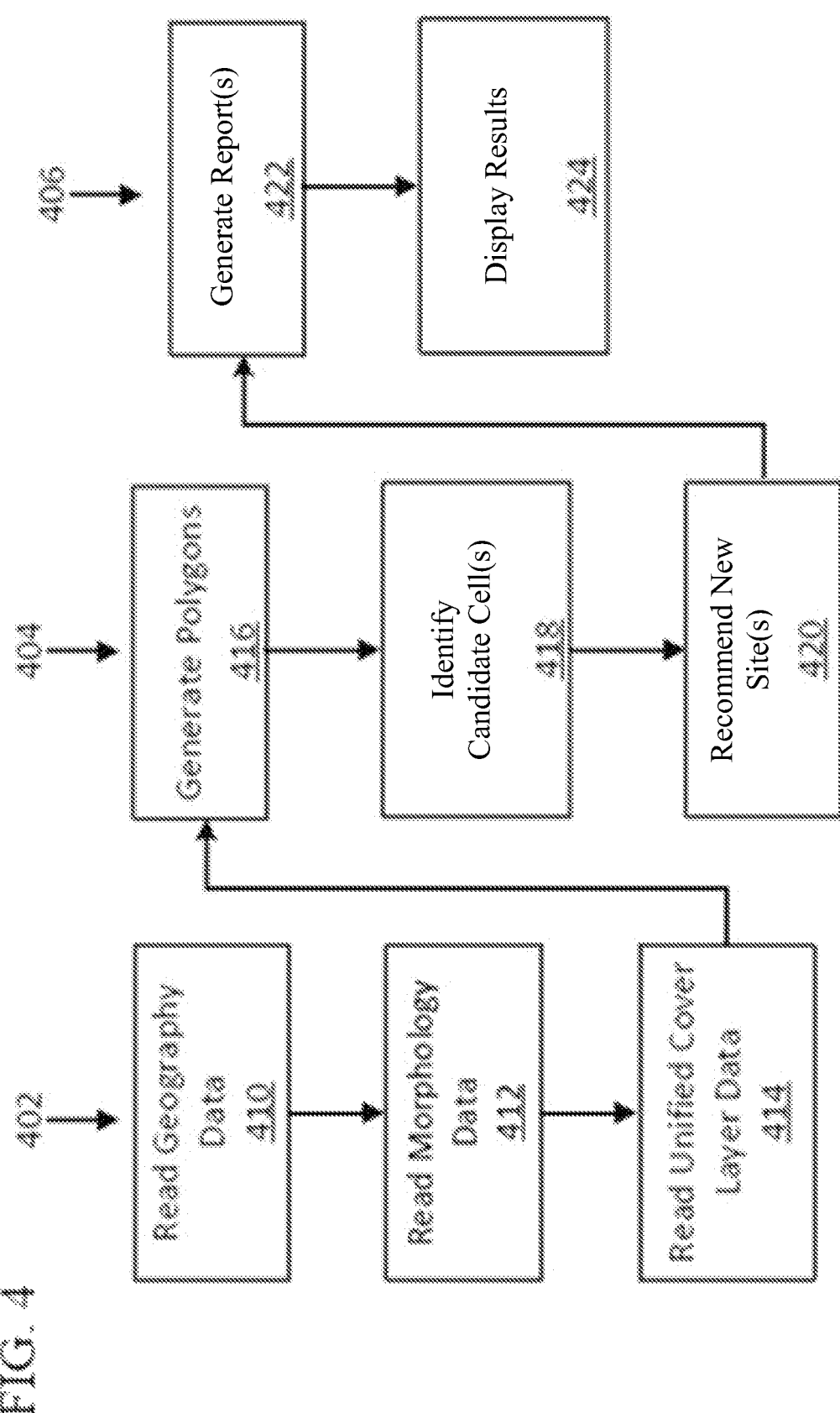
FIG. 4 is a diagram of a process of providing new site recommendations, according to an example embodiment.

FIG. 4 is a diagram of an overall process of mitigating or eliminating service gaps in a telecommunications network via recommending new sites, according to some embodiments. The process may include sub-processes such as an input retrieval sub-process 402, a new site recommendation sub-process 404, and a representation sub-process 406.

In operation 410, the system reads geography data. In operation 412, the system reads morphology data. In operation 414, the system reads unified coverage layer data. In operation 416, the system generates polygons, e.g., by (1) joining the unified coverage layer data and the geography data: (2) joining the morphology data and the geography data: and/or (3) performing grouping based on geography. The one or more generated polygons may represent one or more service gaps. In some embodiments, service gaps may be identified and represented using shapes other than polygons. For example, the system may generate any two or three dimensional shape to represent a service gap in the network. The service gaps, which may be in the form of polygons or any other shape, are then stored.

In operation 418, the system identifies candidate cells, e.g., by (1) reading the generated polygons, (2) reading a graphical UI (GUI) generated based on generated reports, (3) reading on air sites, (4) reading a combined parquet from an HDFS, (5) reading BSP details, and/or (6) identifying BSP and a geolocation sample cell. After the system identifies a candidate cell, the system may save or store the candidate cell. Reading by the system may relate to, e.g., obtaining, analyzing, or performing operations on data. In some embodiments, first a candidate cell is identified, then a best server plot (BSP) of the candidate cell is generated, calculated, or determined.

In some embodiments, a best server plot (BSP) of an identified cell is compared to the service gap of interest, and this comparison may be used to determine whether to mitigate or eliminate the service gap via new site recommendation or another process of mitigating or eliminating the service gap, e.g., (tilt recommendation). For example, an amount of overlap of the identified cell's BSP and the service gap area may be calculated or determined. If the amount of overlap is less greater than or equal to 50%, a tilt recommendation process may be employed. If the amount of overlap is less than 50%, a new site recommendation process may be employed. Also, while a comparison of a candidate cell's BSP to the area of a service gap of interest is used, any criteria may be used to determine which and/or how many recommendation methods to employ. In some embodiments, both of the new site recommendation and tilt recommendation processes may be employed, either sequentially or simultaneously. While 50% is used as one exemplary threshold, any percentage threshold or other way of determining which service gap mitigation/elimination process to use.

In operation 420, the system performs a process of whether or not to recommend one or more new sites to address a service gap of interest. In particular a new site recommendation process may include (1) determining whether or not to recommend one or more new sites, (2) determining a number of new sites to recommend, and/or (3) determining recommended geographic locations of one or more recommended new sites. New site recommendation, according to example embodiments, is further discussed below with reference to FIGS. 5, 6A-6E, and 7.

In operation 422, the system generates one or more reports, e.g., based on recommendations that aim to mitigate or eliminate one or more service gaps. In operation 424, the system displays results. In some embodiments, the displayed results are results related to the generated reports regarding the recommendations to mitigate or eliminate one or more service gaps.

Figure 5:
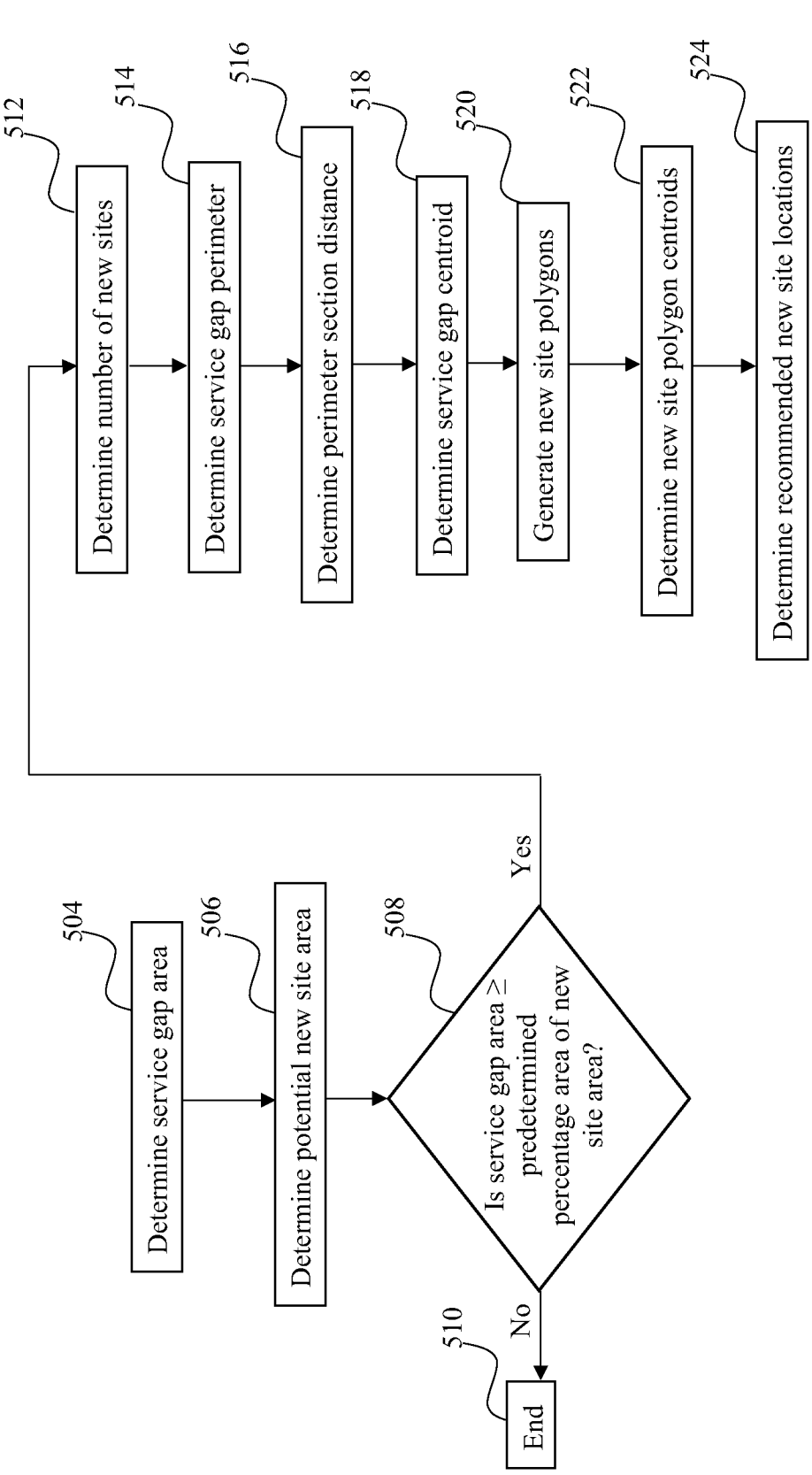
FIG. 5 is a flow diagram of a process of mitigating or eliminating service gaps via new site recommendation(s), according to an example embodiment.

FIG. 5 is a flow diagram of a cell site recommendation process. The process in FIG. 5 consists of a series of operations, which begin at operation 504 in which an area of a service gap (i.e., a "service gap area") is calculated or determined. In one embodiment, a service gap of interest is a two dimensional polygon with known edges and side lengths, and thus a geometrical calculation may be used to determine the area of the service gap of interest. However, as noted, the shape of the service gap is neither limited to a polygon nor a two dimensional shape. As such, any shape, area, or volume of the service gap may be calculated using techniques now known or later developed. The then process proceeds to operation 506.

In operation 506, an area of a potential new site is calculated or determined. The potential new site area may refer to an area of wireless coverage that the potential new site may provide. Formula (1) is an exemplary formula that may be used to calculate potential new site area.

$$\text{Potential New Site Area} = 3.14 \times (\text{Site Radius})^{\wedge}2 \qquad (1)$$

The site radius may refer to a maximum coverage distance measured from the potential new site. If a distance between a wireless device and a potential new site is greater than the site radius, the wireless device may be incapable of maintaining a stable connection with the potential new site. In contrast, if the distance between a wireless device and the potential new site is less than the site radius, the wireless device may be capable of maintaining a stable connection with the potential new site. In some embodiments, the potential new site area is a circular area around the potential new site, but the shape of the potential site area is not necessarily limited thereto. As such, other formulas besides formula (1) above may be used to determine potential new site area.

In some embodiments, a potential new site may be either a macro site or a micro site. In some embodiments, two potential new site areas are calculated, namely, a first potential new site area relating to a potential new macro site and a second potential new site area relating to a potential new micro site. A macro site radius may be equal to 500 meter, and a micro site radius may be equal to 150 meters. Alternate macro site and micro site radii may be used, and thus the macro site radius and the macro site radius is not limited. However, a macro site radius is generally longer than a micro site radius. Similarly, a potential macro site area is generally larger than a potential micro site area. A length of a new site radius and the associated size of the corresponding potential new site area may be dependent on hardware configurations used by the potential new site. After one or more potential new site areas are determined, the process proceeds to operation 508.

In operation 508, the service gap area is compared to a potential new site area in order to make a decision whether or not to recommend any new sites. In some embodiments, the service gap area is compared to a predetermined percentage area of a potential new site area, which may be referred to as a threshold area. As shown in Formula (2) below, the threshold area may be a potential new site area multiplied by a predetermined percentage.

$$\text{Threshold Area} = \text{Predetermined Percentage} \times \qquad (2)$$
$$\text{Potential New Site Area}$$

In one embodiment, the predetermined percentage is 75%, and thus Predetermined Percentage in Formula 2 may be equal to seventy-five divided by one-hundred, i.e., (0.75). While 75% is one exemplary predetermined percentage, the predetermined percentage used to calculate the threshold area is not limited and may be any predefined percentage.

In some embodiments, if it is determined the service gap area is less than the threshold area, it is determined the service gap is too small to warrant recommendation of a new site, and the new site recommendation process proceeds to operation 510. At operation 510, it is determined the number of new sites to recommend is zero and the process ends. In contrast, if it is determined the service gap area is equal to or greater than the threshold area, it may be determined the service gap is large enough to warrant a recommendation at least one new site, and the new site recommendation process continues to operation 512. Exemplary logic of deciding whether to stop at operation 510 or proceed to operation 512 may be shown in Formula (3) below.

$$\text{Decision} = \begin{cases} \text{Stop,} & \text{Service Gap Area} < \text{Threshold Area} \\ \text{Proceed,} & \text{Service Gap Area} \geq \text{Threshold Area} \end{cases} \quad (3)$$

In some embodiments, there may be two threshold areas, namely, a macro threshold area and a micro threshold area. A macro threshold area may be computed by entering a potential new macro site area in the Potential New Site Area variable in Formula (2). This macro threshold area may then be compared to the service gap area using Formula (3) above. If the service gap area is smaller than the macro threshold area, then a micro threshold area may be computed. The micro threshold area may be computed by entering a potential new micro site area in the Potential New Site Area variable in Formula (2). Then, the micro threshold area may be compared to the service gap area using Formula (3) above. If the service gap area is also smaller than the micro threshold area, then the process may proceed to operation 510 where the process ends with determining the number of new sites to recommend is zero.

In some embodiments, if the service gap area is smaller than the macro threshold area but greater than the micro threshold area, the process proceeds to operation 512, but only micro sites may be recommended. In other embodiments, if the service gap is greater than the macro threshold area, the process proceeds to operation 512, and either macro sites alone, micro sites alone, or a combination of macro and micro sites may be recommended, depending on the most efficient way to cover a specific geometry or shape of the service gap of interest.

Accordingly, even though Formula (3) indicates "stop" if the service gap area is smaller than the threshold area, in some embodiments, the process proceeds to re-compute Equation (3) using one or more smaller threshold areas that correspond to progressively smaller potential new site areas related to potential new sites having shorter new site radii. While the embodiment described above uses one macro site and one micro site, operation 508 may be performed with any number of macro sites (e.g., a plurality of macro sites having different macro site radii) and/or any number of micro sites (e.g., a plurality of micro sites having different micro site radii).

As noted, if the service gap area is greater than or equal to the threshold area, the process proceeds to operation 512 in which a positive nonzero number new sites may be recommended. In some embodiments, either or both of Formula (4) or Formula (5) below may be used to calculate or determine a potential number of recommended new sites.

$$\text{Num New Sites}_{HQ} = \lceil \text{Service Gap Area} \div \text{Potential New Site Area} \rceil \quad (4)$$

$$\text{Num New Sites}_{CE} = \lfloor \text{Service Gap Area} \div \text{Potential New Site Area} \rfloor \quad (5)$$

The variable "NumNew Sites$_{HQ}$" in Formula (4) refers to a number of recommended new sites for a high-quality network performance configuration. To calculate NumNewSites$_{HQ}$, the service gap area is divided by the potential new site area, and the result of this division is entered into a "ceiling function" that rounds the result up to the nearest whole number. As such, Formula (4) includes a division of the service gap area and the potential new site area within ceiling brackets.

The variable "NumNewSites$_{CE}$" in Formula (5) refers to a number of recommended new sites for a cost-efficient network configuration. To calculate NumNewSites$_{CE}$, the service gap area is divided by the potential new site area, and then the result of this division is entered into a "floor function" that rounds the result down to the nearest whole number. As such, Formula (5) includes a division of the service gap area and the potential new site area within floor brackets. NumNewSites$_{CE}$ may provide a number of new sites, which is more cost-effective but may cover less service gap area.

Conversely, NumNewSites$_{HQ}$ may provide a number of new sites that may cost more but covers more service gap area thereby providing for more service mitigation or elimination. The specific number of new sites recommended, e.g., either NumNewSites$_{CE}$ or NumNewSites$_{HQ}$ may be dependent on a specific needs, budget, and/or geometrical configuration of the service gap. In some embodiments, the result of the division is rounded up to the nearest whole number if the decimal remainder of the division is greater than or equal to some predetermined threshold decimal remainder (e.g., 0.5 or 0.7) and rounded down if the decimal remainder of the division is less than or equal to the predetermined threshold decimal remainder.

Operation 512 may include either determining a number of new macro sites, determining a number of new micro sites, or both. The number of new macro sites may be determined by calculating either or both of NumNewSites$_{HQ}$ and NumNewSites$_{CE}$ using the aforementioned potential new macro site area. Similarly, the number of new micro sites may be determined by calculating either or both of NumNewSites$_{HQ}$ and NumNewSites$_{CE}$ using the aforementioned potential new micro site area. The system may determine some or all of (1) a number of recommended new macro sites for a high-quality network performance configuration, (2) a number of recommended new macro sites for a cost-efficient network configuration, (3) a number of recommended new micro sites for a high-quality network performance configuration, and (4) a number of recommended new micro sites for a cost-efficient network configuration.

As noted above, the number of recommended sites may be composed of a combination of a number of recommended macro sites and a number of recommended micro sites. The system may use Formulas (6) and (7) below to simultaneously or sequentially compute a number of recommended macro sites and a number of recommended micro sites.

$$\text{Num New Sites}_{MAC} = \text{Service Gap Area} \div \text{Macro Site Area} \quad (6)$$

$$\text{Num New Sites}_{MIC} = \text{Service Gap Area} \div \text{Micro Site Area} \quad (7)$$

Specifically, formula (6) may be used to compute a number of macro recommended macro sites, NumNewSites$_{MAC}$, and formula (7) may be used to calculate a recommended number of micro sites, NumNewSites$_{MIC}$.

In some embodiments, Formulas (6) and/or (7) may include either a ceiling function that rounds the end result up to the nearest whole number, e.g., when a high-quality network performance configuration is desired or necessary. In some embodiments, Formulas (6) and/or (7) may include a floor function that rounds the result down to the nearest whole number, e.g., when a cost-efficient network configuration is desired or necessary.

While Formulas (6) and (7) may be used to calculate a number of recommended macro sites and a number of recommended micro sites, other formulas or methods may be used to determine how many macro and micro sites should be recommended in conjunction.

In some embodiments, an artificial intelligence or machine learning (AI/ML) algorithm may be used to determine an optimal number of macro and micro sites to use in combination. The AI/ML algorithm may be trained with one or more datasets that include various service gap shapes, sizes, and/or other characteristics. Associated with each service gap entry in the training dataset may be a corresponding optimal number of recommended macro sites and number of recommended micro sites. After being trained with the dataset, the AI/ML algorithm accept data related to the service gap of interest as input, and the AI/ML algorithm may respond by determining a recommended number of macro sites and/or micro sites based on the input data of the service gap of interest. In some embodiments, such an AI/ML algorithm may also be used to determine an optimal macro and/or micro site area/radii, hardware specifications, configuration data, etc. that may result in an optimal macro and/or micro site recommendation.

After a number of new sites are determined, the process may proceed to operation 514. In operation 514, a perimeter of the service gap is computed or determined. The perimeter of the service gap may be a length of the boundary of the shape of the service gap. In some embodiments, the service gap is a generated polygon having known edge points and known side lengths. Thus, the perimeter of the service gap polygon may be a summation of the plurality of known side lengths of the service gap polygon. In other embodiments, the service gap may have an irregular shape, e.g., with either rounded or non-linear boundaries. In some embodiments, the perimeter of a non-polygonal service gap may be determined by defining a plurality of points that lie on the boundary of the non-polygonal service gap, connecting the points with lines that approximate the boundaries of the non-polygonal service gap, and adding the lengths of these lines to approximate the perimeter of the non-polygonal service gap. The accuracy of the non-polygonal service gap perimeter calculation may be increased by increasing the number of points defined on the boundary of the non-polygonal service gap.

The process then proceeds to operation 516 in which a perimeter section distance is calculated or determined. The perimeter section distance may be a length of a segment or section along the boundary of the service gap. This section may be used as one side of a new site polygon or shape, which is further discussed below with respect to FIGS. 6A through 6E. In some embodiments, Formula (8) below may be used to calculate or determine the perimeter section distance.

$$\text{Segment Distance} = \text{Service Gap Perimeter} \div \text{Number of Sites} \quad (8)$$

In Formula (8), the perimeter section distance is equal to the service gap perimeter divided by the number of recommended sites. The number of recommended sites used in Formula (8) may be any aforementioned number of recommended sites. In some embodiments, the system may determine multiple perimeter section distances corresponding to different new site configurations, e.g., new site configurations in which only macro sites are recommended, only micro sites are recommended, a combination of macro and micro sites are recommended, high-quality configurations, cost-efficient configurations, etc.

The process may proceed to operation 518 in which a service gap centroid is determined. In one embodiment, the service gap centroid is determined using a method of geometric decomposition. The process may then proceed to operation 520 in which new site polygons are generated based on the service gap centroid and the perimeter section distance. This process of new site polygons being generated is explained further below with respect to FIGS. 6A through 6E. The process may proceed to operation 522 in which centroids of the new site polygons are determined based on the generated new site shapes/polygons. Lastly, the process may end at operation 524 in which recommended new site locations are determined for each recommended new site, the new site locations being based on the centroids of the new site polygons.

Figure 6A:
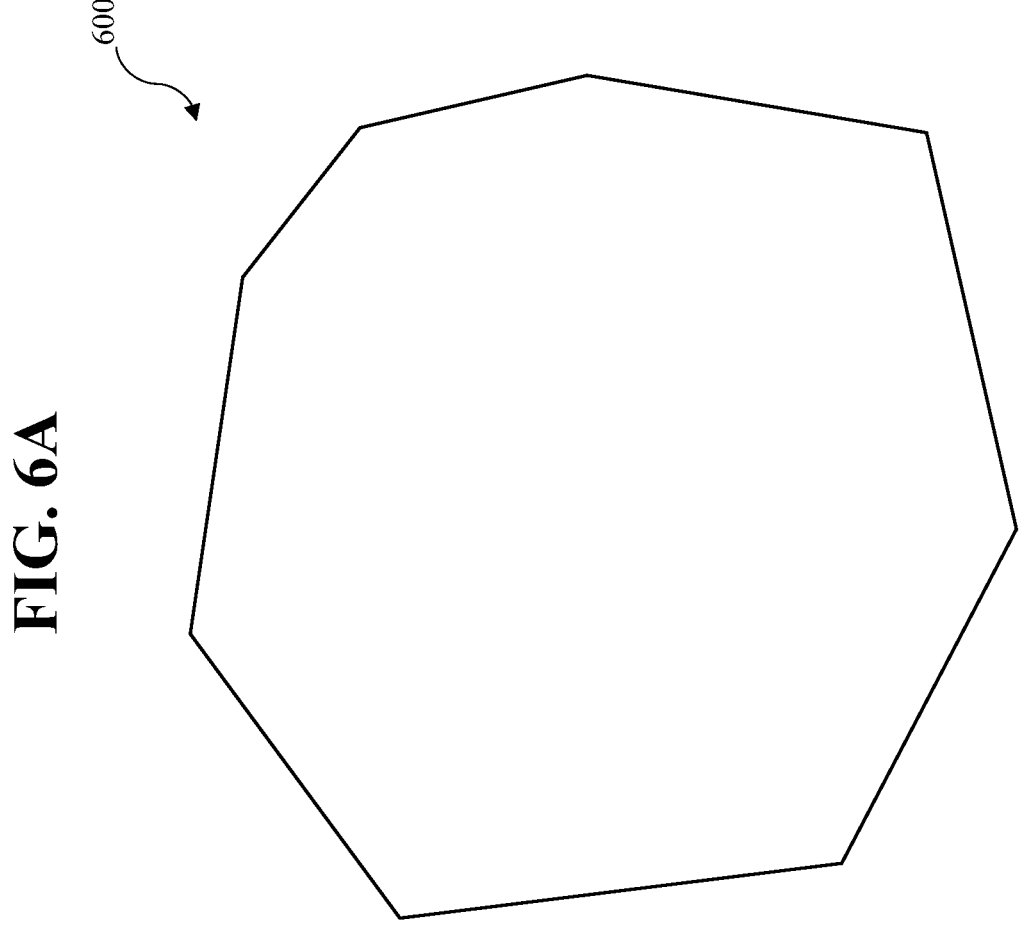
FIGS. 6A through 6E show segmentation of a service gap to determine recommended new site locations, according to an example embodiment.
Figure 6B:
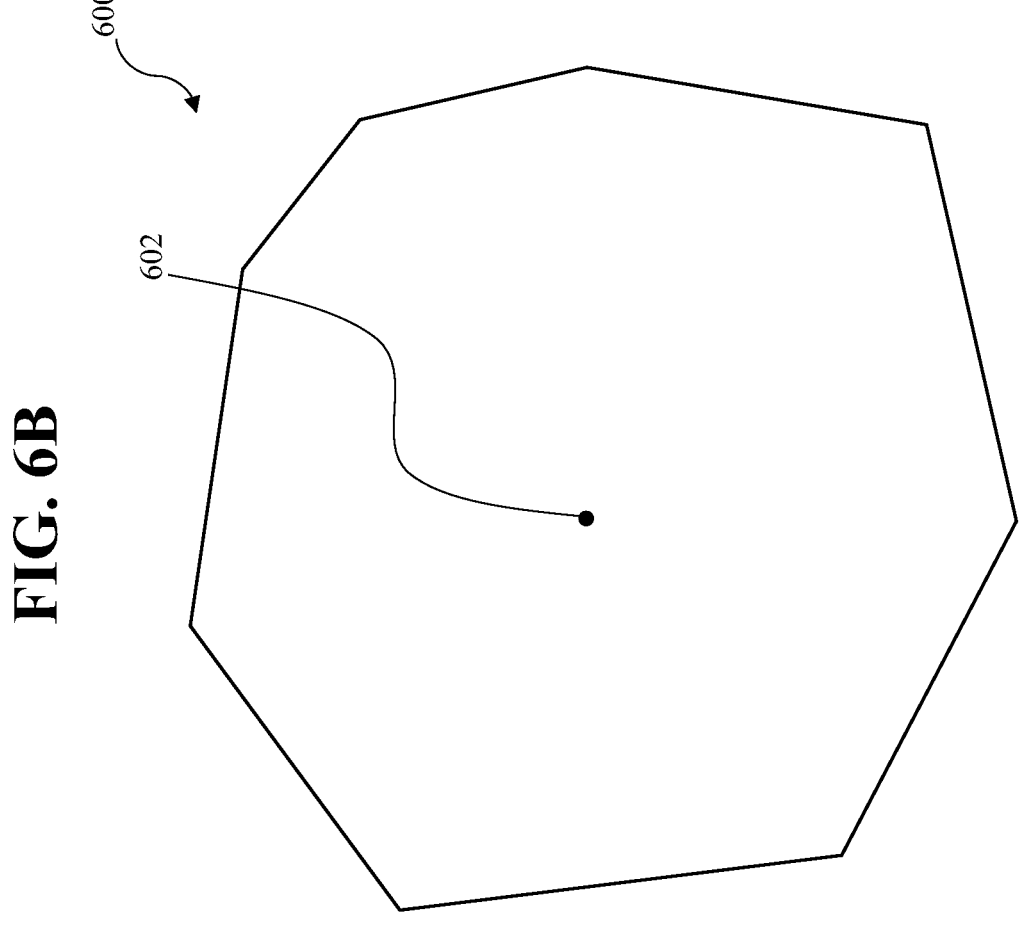

FIGS. 6A through 6E illustrate an exemplary service gap 600, which is segmented into one or more new site polygons in a process of determining new site locations of recommended sites. FIG. 6A shows a service gap 600, which in this embodiment is an asymmetric polygon having eight sides. Using the techniques described herein, an area and a perimeter of the service gap 600 may be computed. For example, the area may be computed by segmenting the service gap into smaller polygons, calculating the area of each of the smaller polygons, and adding the smaller polygon areas together to get the area of the service gap. Also, the perimeter may be computed by adding each length of the eight side lengths together. A centroid 602 of the service gap polygon may be computed, e.g., using geometric decomposition, and FIG. 6B shows the service gap 600 including the centroid 602.

Figure 6C:
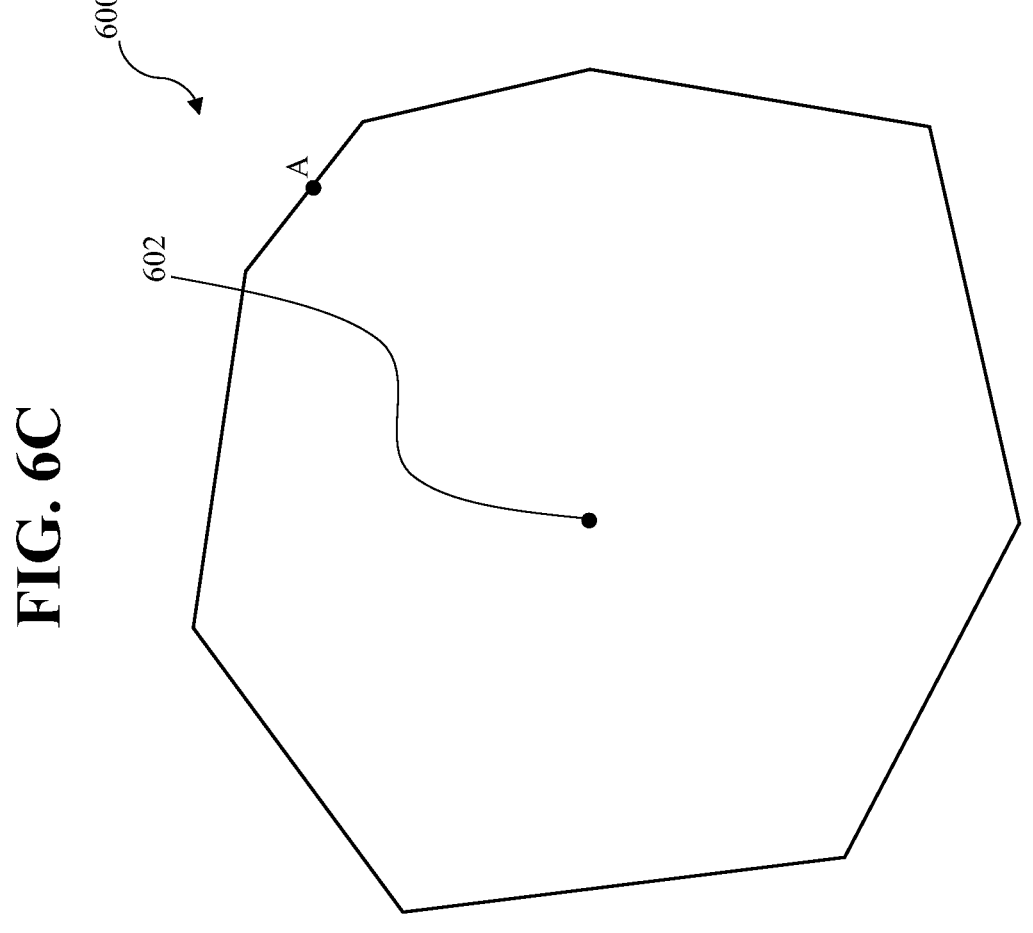

An arbitrary point A on the service gap boundary may be defined. FIG. 6C shows one such arbitrary point A according to one exemplary embodiment. The arbitrary point A may be a starting point for determining boundaries of new site polygons, which is further discussed below. In some embodiments, the point A is specifically chosen for one or more particular reasons and thus may not be entirely "arbitrary." For example, a computer program or application may be used to find an optimal point to be selected as point A on the boundary of the service gap, and an artificial intelligence and/or machine learning algorithm may be used to determine such an optimal point. For example, a program may run a process of trying a variety of different starting points, and using some criteria to determine which of the variety of different starting points yields the best results. The output to such program may be the starting point that yielded the best results, and this starting point may be used as starting point A.

After a number of recommended new sites, a service gap perimeter, and a service gap centroid are calculated or determined, e.g., using the techniques described above, the system may determine a perimeter section distance. The perimeter section distance may be used to generate a perimeter section along the service gap boundary, and this perimeter section may be used as one sectional boundary of a new site polygon. As noted, a perimeter section distance may be calculated or determined, e.g., using Formula (8) above.

In some embodiments, the system uses the calculated perimeter section distance to define additional points along the service gap boundary. For example, the system may use point A as a starting point and move a distance equal to the perimeter section distance in one direction along the boundary of the service gap polygon. From point A, after moving a distance equal to the perimeter section distance along the service gap polygon boundary in the one direction, the system may define an additional point at that location on the service gap polygon boundary. The system may repeat this process of defining points along the service gap polygon boundary, each defined point being separated from the next defined point by a distance equal to the perimeter section distance along the service gap polygon boundary. In the embodiment shown in FIG. 6D, because the number of recommended cell sites in this exemplary embodiment is five, four additional points (i.e., points B, C, D, and E), in addition to starting point A, are defined along the perimeter of the service gap polygon 600. The distance between each adjacent point along the service gap boundary is the same and equal to the perimeter section distance.

Figure 6D:
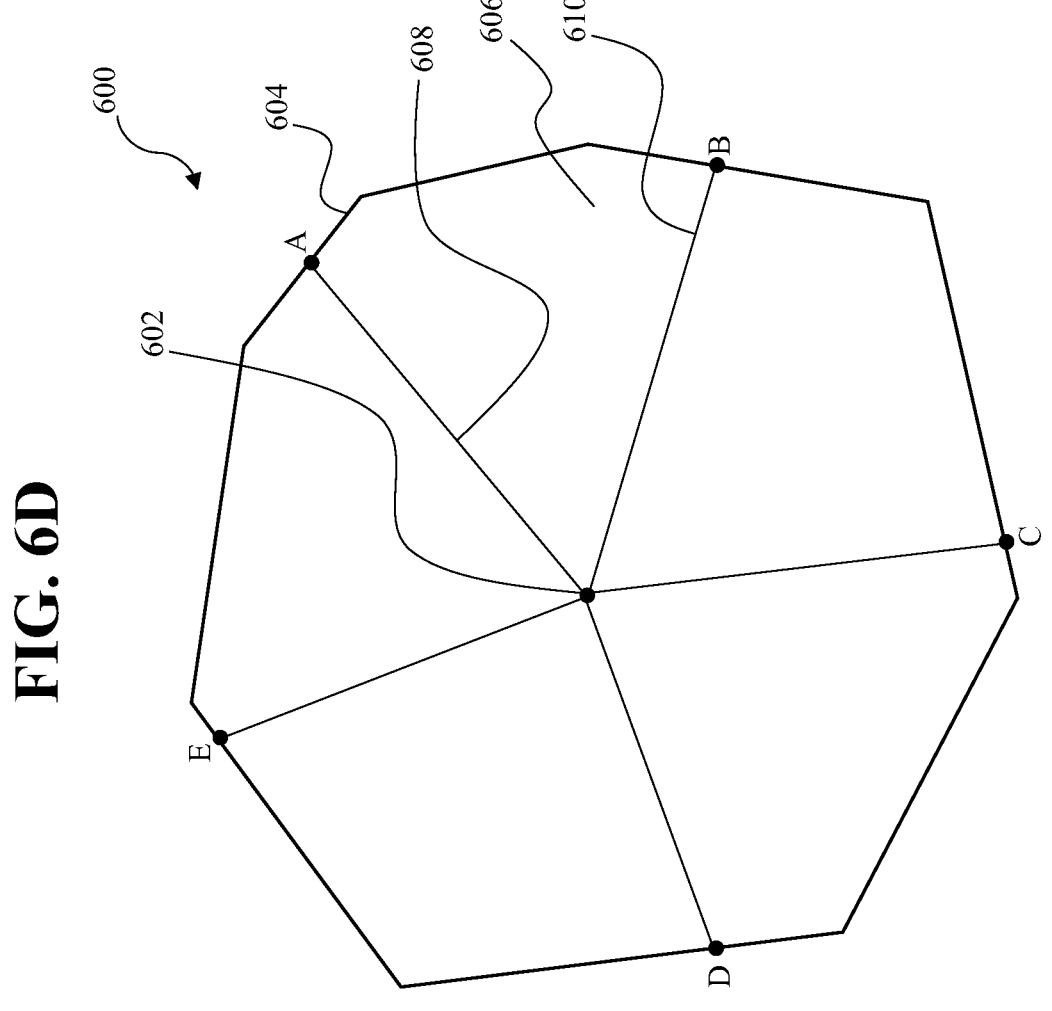

Outer section 604 is a section defined by the service gap boundary between defined points A and B. Outer section 604 will be one section of a boundary of a new site polygon 606. The remaining boundaries of this new site polygon 606 consist of two lines, one line 608 between point A to the service gap centroid and another line 610 between point B to the service gap centroid. FIG. 6D shows outer section 604 and lines 608 and 610 that form the boundaries of new site polygon 606. In a similar way, additional new site polygons may be created by connecting lines between the service gap centroid and each of lines C, D, and E. The boundaries of each new site polygons include a perimeter section between adjacent boundary points and two lines that connect each of said adjacent boundary point to the service gap centroid. If the service gap is polygonal, the new site polygons will also be polygonal, however, if the service gap has a non-polygonal shape, the "new site polygons" are not be polygonal. In such embodiments, the "new site polygons" may be referred to as "new site shapes," which have non-polygonal shape in the perimeter sections of each new site shape.

Figure 6E:
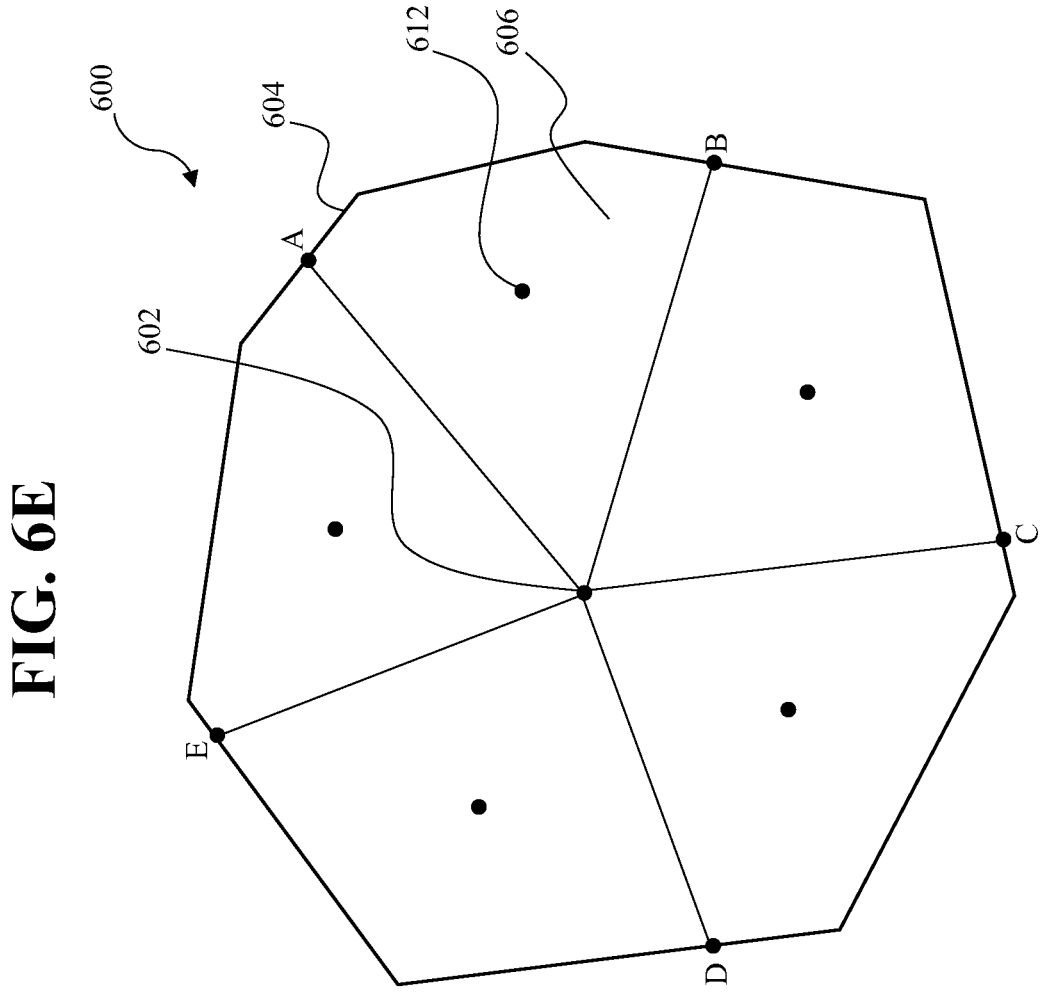

After the new site polygons (or new site shapes) are generated, centroids of each new site polygon are generated, e.g., using geometric decomposition. FIG. 6E shows centroids for each of the new site polygons. For example, new site polygon 606 has centroid 612. Each of the centroids of each of the new site polygons may be used to determine a recommended site location of the recommended sites. In some embodiments, the centroids of the new site polygons are the locations of the recommended new sites.

In some embodiments, the new site polygon centroids must be modified or "corrected" to reflect actual locations on a map of the actual service gap of interest. For example, the positions of the new site polygon centroids may be used to generate coordinates, e.g., latitudinal and longitudinal coordinates, of the recommended new site locations, and thus new sites constructed at such recommended site locations may mitigate or eliminate the service gap of interest. The coordinates may be GPS coordinates or coordinates of GLONASS, Beidou, Galileo, SBAS, Quasi-Zenith, or NavIC, or coordinates of any other navigation system now known or later developed. While nagivation system coordinates are one exemplary way of expressing geographic locations of the recommended new sites, the manner of expressing a geographic location of a recommended site is not limited thereto and may include any manner of expressing geographic location now known or later developed.

As noted, the results of the processes herein may be recommendations of optimal site locations, but for one reason or another, a recommended site location may be difficult or impossible to make a reality. For example, there may be existing infrastructure, undesirable topography, or other factors, which may make building a new site at the recommended site location difficult, cost-prohibitive, or expensive. To address this obstacle, the system may further include additional or alternative corrections to the recommended site locations to move the recommended site location some distance from the initial recommended site location to a feasible site location. The system may therefore include inputs or logic to determine instances of difficult, impossible or undesirable locations or areas, and use such inputs/logic to modify or correct the recommended site locations to adjusted recommended site locations.

The aforementioned process of dividing a service gap area into a number of new site polygons, and determining recommended site locations based on the centroids of the new site polygons may be repeated for a number of different configurations, e.g., configurations in which only macro sites are recommended, only micro sites are recommended, a combination of macro and micro sites are recommended, high-quality configurations, cost-efficient configurations, etc.

In an embodiment in which a combination of macro and micro sites are recommended in conjunction, the system may utilize two perimeter section distances, one for new site polygons corresponding to the recommended macro sites and another for new site polygons corresponding to the recommended micro sites. As such, there may be an additional step of adjusting the generated points along the service gap perimeter such that the new site polygons corresponding to the recommended macro sites are larger than the new site polygons corresponding to the recommended micro sites. In one embodiment a ratio of the macro and micro perimeter section distances may be used for such adjustment. This ratio being equal to some ratio, which may be based on the macro and micro radii or the macro and micro site areas.

The results of one or more of these configurations, which produce variations of recommended sites and locations thereof may be produced in a report displayed on a GUI, and network provider may use the report to determine which configuration best accomplishes their business goals.

Additionally, this process may be repeated for a plurality of different service gaps in a network, and thus the techniques herein provide an efficient and cost-effective way to producing new site recommendations along with locations for such recommended sites. Such recommendations enable service providers to quickly and cost-effectively address, e.g., mitigate or eliminate, service gaps in a network to therefore provide higher-quality service for their customers.

FIG. 7 is a flowchart of a method of mitigating or eliminating service gaps via new site recommendation(s), according to an example embodiment. In operation 702, a service gap area and a candidate site area are determined. In operation 704, a candidate site area is multiplied by a predetermined percentage to determine a threshold. In operation 706, when the service gap area is greater than or equal to the threshold, the service gap area is divided by the candidate site area to determine a number of recommended sites. In operation 708, a centroid and a perimeter of the service gap are determined. In operation 710, a perimeter section distance is determined by dividing the perimeter of the service gap by the number of recommended sites. In operation 712, a new site shape is generated based on the service gap centroid, a point on the service gap boundary, and the perimeter section distance: and in operation 714, a recommended site location is determined based on a centroid of new site shape.

The foregoing disclosure provides illustration and description, but is not intended to be exhaustive or to limit the implementations to the precise form disclosed. Modifications and variations are possible in light of the above disclosure or may be acquired from practice of the implementations.

Some embodiments may relate to a system, a method, and/or a computer readable medium at any possible technical detail level of integration. The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

The descriptions of the various aspects and embodiments have been presented for purposes of illustration, but are not intended to be exhaustive or limited to the embodiments disclosed. Even though combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of determining a number of recommended sites, the method comprising:

determining an area size value of a service gap;
determining an area size value of a candidate site;
comparing the area size value of the service gap to the area size value of the candidate site to determine a comparison; and
recommending, based on the comparison, at least one of a new site or a tilt recommendation to mitigate the service gap.

2. The method of claim 1, wherein the comparing the area size value of the service gap to the area size value of the candidate site comprises:

multiplying the area size value of the candidate site by a predetermined percentage to determine a threshold; and
comparing the area size value of the service gap to the threshold.

3. The method of claim 2, wherein the recommending comprises not recommending the new site when the area size value of the service gap is less than the threshold.

4. The method of claim 2, wherein the recommending comprises recommending a positive nonzero integer number of new sites when the area size value of the service gap is greater than or equal to the threshold.

5. The method of claim 1, further comprising:

determining a centroid of the service gap and a perimeter of the service gap;
determining a distance of a perimeter section of the service gap;
determining a portion of the perimeter of the service gap corresponding to the perimeter section; and
determining a shape of a recommended site based on the centroid of the service gap and the portion of the perimeter of the service gap corresponding to the perimeter section.

6. The method of claim 5, wherein the determining the distance of the perimeter section of the service gap comprises dividing the perimeter of the service gap by the number of recommended sites.

7. The method of claim 5, further comprising:

determining a centroid of the shape of the recommended site; and
determining a recommended site location based on the centroid of the shape of the recommended site.

8. The method of claim 1, wherein:

the candidate site is either a macro site or a micro site, and
a number of recommended new sites is either a number of recommended macro sites or a number of recommended micro sites.

9. The method of claim 1, wherein a number of recommended new sites is a combination of a number of recommended macro sites and a number of recommended micro sites.

10. An information processing system for determining a number of recommended sites, the system comprising:

at least one memory configured to store computer program code; and
at least one processor configured to access said at least one memory and operate as instructed by said computer program code, said computer program code including:
first determining code configured to cause at least one of the at least one processor to determine an area size value of a service gap;
second determining code configured to cause at least one of the at least one processor to determine at least one of an area size value of a macro site or an area size value of a micro site;
comparing code configured to cause at least one of the at least one processor to compare the area size value of the service gap to at least one of the area size value of the macro site or the area size value of the micro site to determine a comparison; and
third determining code configured to cause at least one of the at least one processor to recommend, based on the comparison, at least one of a new site or a tilt recommendation to mitigate the service gap.

11. The information processing system of claim 10, wherein the comparing code is further configured to cause the at least one of the at least one processor to:

multiply at least one of the area size value of the macro site or the area size value of the micro site by a predetermined percentage to determine a threshold; and
compare the area size value of the service gap to the threshold.

12. The information processing system of claim 11, wherein the third determining code is further configured to cause at least one of the at least one processor to not recommend the new site when the area size value of the service gap is less than the threshold.

13. The information processing system of claim 11, wherein the third determining code is further configured to cause at least one of the at least one processor to recommend a positive nonzero integer number of new sites when the area size value of the service gap is greater than or equal to the threshold.

14. The information processing system of claim 10, further comprising:

fourth determining code configured to cause at least one of the at least one processor to determine a centroid of the service gap and a perimeter of the service gap;
fifth determining code configured to cause at least one of the at least one processor to determine a distance of a perimeter section of the service gap;

sixth determining code configured to cause at least one of the at least one processor to determine a portion of the perimeter of the service gap corresponding to the perimeter section; and seventh determining code configured to cause at least one of the at least one processor to determine a shape of a recommended site based on the centroid of the service gap and the portion of the perimeter of the service gap corresponding to the perimeter section.

15. The information processing system of claim 14, wherein the fifth determining code is further configured to cause at least one of the at least one processor to divide the perimeter of the service gap by the number of recommended sites.

16. The information processing system of claim 14, further comprising:

eighth determining code configured to cause at least one of the at least one processor to determine a centroid of the shape of the recommended site; and ninth determining code configured to cause at least one of the at least one processor to determine a recommended site location based on the centroid of the shape of the recommended site.

17. The information processing system of claim 10, wherein a number of recommended new sites is either a number of recommended macro sites or a number of recommended micro sites.

18. The information processing system of claim 10, wherein a number of recommended new sites comprises a combination of a number of recommended macro sites and a number of recommended micro sites.

\* \* \* \* \*